US012675217B2

(12) United States Patent
Chuggani et al.

(10) Patent No.: US 12,675,217 B2
(45) Date of Patent: Jul. 7, 2026

(54) METHODS AND SYSTEMS FOR MANAGING COMPRESSED DATA IN DISK BLOCKS

(71) Applicant: NETAPP, INC., San Jose, CA (US)

(72) Inventors: Roopesh Chuggani, Jaipur (IN); Girish Hebbale Venkatasubbaiah, Bangalore (IN); Dnyaneshwar Nagorao Pawar, Bangalore (IN); Venkateswarlu Tella, Bangalore (IN); Kevin Daniel Varghese, Milpitas, CA (US); Sushilkumar Gangadharan, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/893,126

(22) Filed: Sep. 23, 2024

(65) Prior Publication Data
US 2025/0335090 A1 Oct. 30, 2025

(30) Foreign Application Priority Data
Apr. 30, 2024 (IN) .............................. 202441034166

(51) Int. Cl.
G06F 3/06 (2006.01)

(52) U.S. Cl.
CPC .......... G06F 3/0608 (2013.01); G06F 3/0638 (2013.01); G06F 3/0674 (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24;

(Continued)

(56) References Cited

U.S. PATENT DOCUMENTS 9,600,420 B2 * 3/2017 Oportus Valenzuela ....................
G06F 12/1009
10,169,359 B1 * 1/2019 Pinho .................... G06F 16/182

(Continued)

OTHER PUBLICATIONS

A. Jagmohan, M. Franceschini and L. Lastras, "Write amplification reduction in NAND Flash through multi-write coding," 2010 IEEE 26th Symposium on Mass Storage Systems and Technologies (MSST), Incline Village, NV, USA, 2010, pp. 1-6, doi: 10.1109/MSST.2010. 5496985. (Year: 2010).*

*Primary Examiner* — Daniel C. Chappell

(74) *Attorney, Agent, or Firm* — Jaffery Watson Hamilton & DeSanctis LLP

(57) ABSTRACT

Methods and systems involve sequentially storing compressed data segments received at a storage system in disk blocks such that at least one of the disk blocks includes compressed data from at least two of the compressed data segments.

23 Claims, 8 Drawing Sheets

(58) Field of Classification Search
CPC .......... G11B 33/00–1493; G11C 11/00–5692;
G11C 13/00–06; G11C 14/00–009; G11C
15/00–06; G11C 16/00–3495; G11C
17/00–18; G11C 2207/00–229; G11C
2216/00–30; H01L 25/00–50; H01L
2225/00–1094; H03M 7/00–707; H04L
9/00–38; H04L 12/00–66; H04L
41/00–5096; H04L 49/00–9094; H04L
61/00–59; H04L 67/00–75
See application file for complete search history.

(56) References Cited

U.S. PATENT DOCUMENTS

| | | | |
|---|---|---|---|
| 10,579,591 B1 * | 3/2020 | Diamant | G06F 16/1727 |
| 2003/0218554 A1 * | 11/2003 | McGuire | H03M 7/40 |
| | | | 341/65 |
| 2009/0012982 A1 * | 1/2009 | Merchia | H03M 7/30 |
| 2010/0228800 A1 * | 9/2010 | Aston | G06F 3/0608 |
| | | | 711/E12.001 |
| 2018/0039426 A1 * | 2/2018 | Xie | G06F 3/0608 |
| 2021/0117132 A1 * | 4/2021 | Vankamamidi | G06F 3/0688 |
| 2021/0303522 A1 * | 9/2021 | Periyagaram | G06F 16/178 |
| 2021/0397350 A1 * | 12/2021 | Luo | G06F 3/0608 |

* cited by examiner

Receive a plurality of compressed data segments to be stored in disk blocks at a storage system    802

Sequentially store the compressed data segments in the disk blocks such that at least one of the disk blocks includes compressed data from at least two of the compressed data segments    804

METHODS AND SYSTEMS FOR MANAGING COMPRESSED DATA IN DISK BLOCKS

CROSS-REFERENCE TO RELATED APPLICATIONS

This patent application claims priority under 35 U.S.C. 119(a) to the Provisional Indian Patent Application, Ser. No. 202441034166, entitled "METHODS AND SYSTEMS FOR MANAGING COMPRESSED DATA IN DISK BLOCKS", filed on Apr. 30, 2024, the disclosure of which is incorporated herein by reference in its entirety.

TECHNICAL FIELD

The present disclosure relates to storage systems, and more particularly to packing, garbage collecting and repacking compressed data in disk blocks in a storage system.

BACKGROUND

Various forms of storage systems are used today. These forms include direct attached storage (DAS) systems, network attached storage (NAS) systems, storage area networks (SANs), and others. Networked storage systems are commonly used for a variety of purposes, such as providing multiple users with access to shared data, backing up data and others.

In some storage systems, compressed data segments are stored in fixed size disk blocks such that data from a single compressed data segment is stored on each disk block. In addition, the compressed data segments stored in the fixed size disk blocks may be garbage collected and repacked in new disk blocks as needed. Although the conventional techniques for storing, garbage collecting and repacking compressed data segments may work well, there is a need for a more efficient technique for storing, garbage collecting and repacking compressed data segments in fixed size disk blocks.

SUMMARY

Methods and systems involve sequentially storing compressed data segments received at a storage system in disk blocks such that at least one of the disk blocks includes compressed data from at least two of the compressed data segments.

A method executed by one or more processors in accordance with an embodiment of the invention comprises receiving a plurality of compressed data segments to be stored in disk blocks at a storage system, and sequentially storing the compressed data segments in the disk blocks such that at least one of the disk blocks includes compressed data from at least two of the compressed data segments. In some embodiments, the steps of this method are performed when program instructions contained in a non-transitory computer-readable storage medium are executed by one or more processors.

A system in accordance with an embodiment of the invention comprises memory and at least one processor configured to receive a plurality of compressed data segments to be stored in disk blocks at a storage system, and sequentially store the compressed data segments in the disk blocks such that at least one of the disk blocks includes compressed data from at least two of the compressed data segments.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

The foregoing features and other features will now be described with reference to the drawings of the various aspects and embodiments of the present disclosure. In the drawings, the same components have the same reference numerals, and similar reference numbers may be used to identify similar elements. The illustrated embodiments and aspects are intended to illustrate, but not to limit the present disclosure. The drawings include the following figures.

DETAILED DESCRIPTION

In one aspect, innovative computing technology is disclosed to sequentially pack compressed data segments in disk blocks (e.g., fixed size disk blocks) in a storage system, which can significantly reduce unused or wasted disk block space. In addition, the innovative computing technology provides techniques to identify the stored compressed data segments that are garbage collectible and to repack sequential compressed data chunks (each sequential compressed data chunk includes one or more compressed data segments that are stored in contiguous disk blocks that include fragmented or partially used disk blocks) to ensure storage efficiency. Details regarding the innovative technology are provided below.

As preliminary note, the terms "component", "module", "system," and the like as used herein are intended to refer to a computer-related entity, either software-executing general-purpose processor, hardware, firmware and a combination thereof. For example, a component may be, but is not limited to being, a process running on a processor, a hardware-based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), solid state drive, hard disk, EEPROM (electrically erasable programmable read only memory), non-volatile memory or any other storage device, in accordance with the claimed subject matter.

Figure 1:
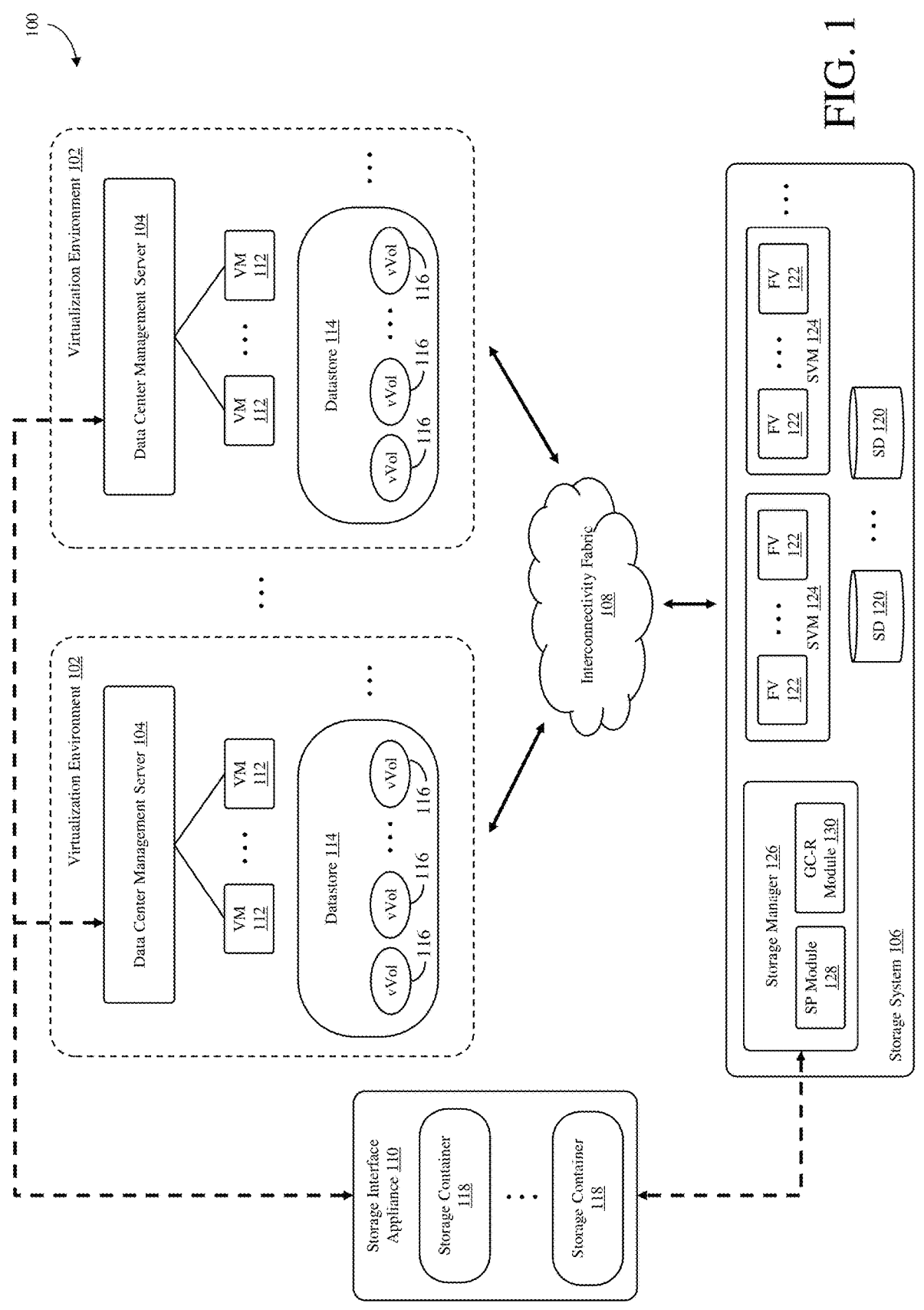
FIG. 1 shows a networked storage system in which embodiments of the invention may be implemented.

Turning now to FIG. 1, a networked storage system 100 in which embodiments of the invention may be implemented is illustrated. As shown in FIG. 1, the system 100 includes multiple virtualization environments 102, each of which may be created and managed by a data center management server 104. The virtualization environments 102 are connected to a storage system 106 via an interconnectivity fabric 108. The storage system 106 provides storage resources to the virtualization environments 102, which are managed by a storage interface appliance 110.

Each of the virtualization environments 102 may include one or more virtual computing instances 112, which may operate as virtualized computer systems. As used herein, the term "virtual computing instance" refers to any software processing entity that can run on a computer system, such as a software application, a software process, a virtual machine and a container. A virtual machine is an emulation of a physical computer system in the form of a software computer that, like a physical computer, can run an operating system and applications. A virtual machine may be comprised of a set of specification and configuration files and backed by the physical resources of a physical host computer. A virtual machine may have virtual devices that provide the same functionality as physical hardware and have additional benefits in terms of portability, manageability, and security. An example of a virtual machine is the virtual machine created using VMware vSphere® solution made commercially available from VMware, Inc of Palo Alto, California. A virtual container is a package that relies on virtual isolation to deploy and run applications that access a shared operating system (OS) kernel. An example of a virtual container is the virtual container created using a Docker engine made available by Docker, Inc. In this disclosure, the virtual computing instances will be described as being virtual machines (VMs), although embodiments of the invention described herein are not limited to VMs.

Each virtualization environment 102 may include one or more datastores 114, which include logical storage units in the form of virtual volumes (vVols) 116 for the VMs 112 or other programs/applications/processes in that virtualized environment. Unlike traditional logical unit number (LUN) and Network File System (NFS) based storage, the vVols functionality may not require preconfigured volumes on a storage side. Instead, vVols can use a storage container, which is a pool of raw storage capacity or an aggregation of storage capabilities that a storage system can provide to vVols. The vVols 116 in the datastores 114 may include different types of vVols or other types of logical storage units, which are used to store various data for the VMs. As an example, the vVols 116 in the datastores 114 may include data, configuration and snapshot vVols. The datastores 114 of the virtualization environments 102 are supported by the storage resources of the storage system 106, and managed by the storage interface appliance 110.

Although the logical storage units 116 are described herein as being vVols, in other embodiments, the logical storage units 116 may include different type of logical storage units, such as first class disks (FCDs).

In an embodiment, the virtualization environments 102, the storage system 106, the interconnectivity fabric 108 and/or the storage interface appliance 110 may be supported by a cloud provider that provides access to cloud-based storage via a cloud layer executed in a cloud computing environment. Cloud computing means computing capability that provides an abstraction between the computing resource and its underlying technical architecture (e.g., servers, storage, and networks), enabling convenient, on-demand network access to a shared pool of configurable computing resources that may be rapidly provisioned and released with minimal management effort or service provider interaction. The term "cloud" herein is intended to refer to a network, for example, the Internet and cloud computing allows shared resources.

Typical cloud computing providers deliver common business applications online which are accessed from another web service or software like a web browser, while the software and data are stored remotely on servers. The cloud computing architecture uses a layered approach for providing application services. The first layer is an application layer that is executed at client computers. After the application layer is a cloud platform and cloud infrastructure, followed by a "server" layer that includes hardware and computer software designed for cloud specific services.

Figure 2:
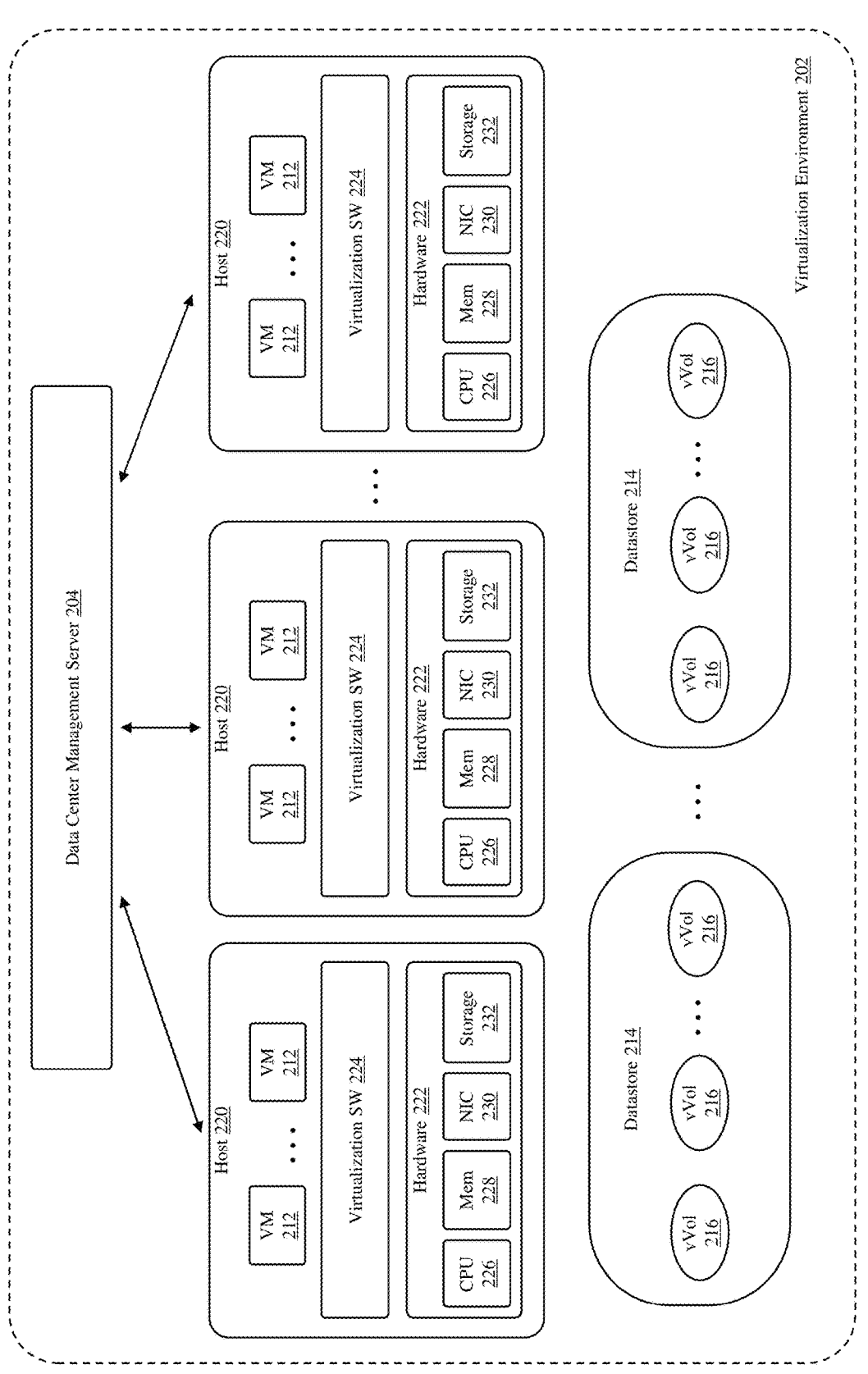
FIG. 2 shows a representative virtualization environment, which may be included in the networked storage system shown in FIG. 1, in accordance with an embodiment of the invention.

FIG. 2 shows a representative virtualization environment 202 that may be included in the networked storage system 100 in accordance with an embodiment of the invention. As shown in FIG. 2, the virtualization environment 202 includes a data center management server 204 and a number of host computers (hosts) 220. The virtualization environment 202 may include other components commonly found in virtualization environments in which VMs are deployed, such as components that provide and support software-defined networking.

The data center management server 204 operates to manage and monitor the hosts 220. The data center management server may be configured to allow an administrator to create one or more clusters of hosts, add hosts to the clusters and delete hosts from the clusters. The data center management server may also be configured to monitor the current configurations of the hosts and any virtual computing instances 212 running on the hosts, which are shown as VMs in the illustrated embodiment. The monitored configurations may include hardware and software configurations of each of the hosts. The monitored configurations may also include VM hosting information, i.e., which VMs are hosted or running on which hosts. The monitored configurations may also include information regarding the VMs running on the different hosts.

The data center management server 204 may also perform operations to manage the VMs 212 and the hosts 220. As an example, the data center management server may be configured to perform various resource management operations, including VM placement operations for either initial placement of VMs and/or load balancing. The process for initial placement of VMs may involve selecting suitable hosts for placement of the VMs based on, for example, memory and central processing unit (CPU) requirements of the VMs, the current memory and CPU loads on the hosts and the memory and CPU capacity of the hosts.

In some embodiments, the data center management server 204 may be a physical computer. In other embodiments, the data center management server may be implemented as one or more software programs running on one or more physical computers, such as the hosts 220, or running on one or more VMs, such as the VMs 212. In a particular implementation, the data center management server is a VMware vCenter™ server with at least some of the features available for such a server.

As illustrated in FIG. 2, each host 220 in the virtualization environment 202 includes hardware 222 and a virtualization software 224. The hardware 222 of each host 220 includes hardware components commonly found in a physical computer system, such as one or more processors 226, one or more system memories 228, one or more network interfaces 230 and one or more local storage devices 232 (collectively referred to herein as "local storage"). Each processor 226 can be any type of a processor, such as a CPU commonly found in a server. In some embodiments, each processor may be a multi-core processor, and thus, includes multiple independent processing units or cores. Each system memory 228, which may be random access memory (RAM), is the volatile memory of the host 220. The network interface 230 is an interface that allows the host computer to communicate with a network, such as the Internet. As an example, the network interface may be a network adapter. Each local storage device 232 is a nonvolatile storage, which may be, for example, a solid-state drive (SSD) or a magnetic disk.

The virtualization software (SW) 224 of the host 220, which may be referred to as a hypervisor or a virtual machine monitor (VMM), enables sharing of the hardware resources of that host by virtual computing instances, such as the VMs 212, running on the host computer. As an example, the virtualization software 224 may be a processor executed hypervisor layer provided by VMWare Inc., Hyper-V layer provided by Microsoft Corporation of Redmond, Washington or any other virtualization layer type. With the support of the virtualization software 224, the VMs 212 provide isolated execution spaces for guest software running on the VMs. In the illustrated embodiment, the virtualization software 224 is executed by the host 220. However, in other embodiments, the virtualization software 224 may be executed by an independent stand-alone computing system, often referred to as a hypervisor server or VMM server, where VMs are deployed on another computing system(s).

In an embodiment, the VMs 212 deployed in the virtualization environment 202 use vVols 216 in datastores 214, which are supported by a storage system, such as the storage system 106, for storing various information. Each VM 212 may use one or more vVols to store, but not limited to, disk data, configuration data and snapshot data. Thus, the vVols 216 may be used for VM files and virtual disks. In a particular implementation, the vVols 216 may be VMware vSphere Virtual Volumes.

In an embodiment, the hosts 220 have no direct access to the vVols 216 on the storage side. Instead, the hosts may use a logical input/output (I/O) proxy, which may be called a protocol endpoint, to communicate with a storage system, e.g., the storage system 106, on which the data of the vVols 216 are stored. The hosts may use these protocol endpoints to establish a data path on demand from the VMs 212 to their respective vVols.

Turning back to FIG. 1, the storage interface appliance 110 of the networked storage system 100 operates as an interface between the data center management servers 104 of the virtualization environments 102 and the storage system 106 to provide the vVol datastores 114 to the virtualization environments 102. In one aspect, the storage interface appliance 110 allows users to create and manage the vVols 116 for the virtualization environments 102, which are supported by the storage system 106, as described in more detail below. In order to create and manage the vVols 116, the storage interface appliance 110 creates storage containers 118, which represent the datastores 114 that are available to the virtualization environments 102. In an embodiment, the storage interface appliance 110 may be or may include a virtual volume storage provider, which may be called a vSphere APIs for Storage Awareness (VASA) provider. Thus, the storage interface appliance 110 may be configured to execute various capabilities found in a conventional VASA provider.

Components in the virtualization environments 102, such as the data center management servers 104 and the VMs 112, are communicably coupled to the storage system 106. In the illustrated embodiment, these components can access the storage system 106 through the interconnectivity fabric 108, which may include one or more local area networks (LANs), one or more wide area networks (WANs), the Internet and/or other network connections. As described herein, the term "communicably coupled" may refer to a direct connection, a network connection, or other connections to enable communication between computing and network devices.

The storage system 106 has access to a set of mass storage devices (SDs) 120, which may be used to store data for the vVols 116, as well as other data. The storage devices 120 may include writable storage device media, such as solid-state drives, storage class memory, magnetic disks, video tape, optical, DVD, magnetic tape, non-volatile memory devices for example, self-encrypting drives, or any other storage media adapted to store structured or non-structured data. The storage devices 120 may be organized as one or more groups of Redundant Array of Independent (or Inexpensive) Disks (RAID). The various aspects disclosed are not limited to any specific storage device or storage device configuration.

In the illustrated embodiment, the storage system 106 includes a number of flexible logical storage units in the form of flexible volumes (FVs) 122, which may increase or decrease their size as needed. The flexible volumes 122 may be created when the storage containers 118 for the datastores 114 are created. One storage container may have more than one flexible volumes, each of which can support one or more vVols. In an embodiment, a flexible volume may be a data container associated with a storage virtual computing instance 124, which may have multiple flexible volumes. In the illustrated embodiment, the storage virtual computing instance 124 is shown as being a storage VM (SVM). However, in other embodiments, the storage virtual computing instance 124 may be a different type of virtual computing instance. In addition, there may be multiple storage virtual computing instances 124 deployed in the storage system 106. In a particular implementation, the flexible volumes 122 may be Flex Vol® volumes, which are provided by NetApp Inc.

The storage system 106 further includes a storage manager 126, which operates to control and manage the storage devices 120 to support the flexible volumes 122 in the virtual computing instance 124. The storage manager 126 may communicate with the storage interface appliance 110 in order to manage the vVols 116 presented to the virtualization environments 102 via their data center management servers

104. In an embodiment, the storage manager 126 may include a storage operating system for storing and retrieving data on behalf of one or more client computing systems, e.g., the VMs 112. Although the storage system 106 is shown with a single storage manager, in other embodiments, the storage system 106 may include a cluster of storage controllers, which may be associated with cluster interconnect switches connecting the storage controllers. In a particular implementation, the storage manager 126 may include one or more storage controllers available from NetApp, Inc.

The storage system 106 may be used to store and manage information at the storage devices 120 based on requests generated by applications executed on the VMs 112 in the virtualization environments 102 or any other entities. The requests may be based on file-based access protocols, for example, the Common Internet File System (CIFS) protocol or Network File System (NFS) protocol, over the Transmission Control Protocol/Internet Protocol (TCP/IP). Alternatively, the requests may use block-based access protocols for storage area network (SAN) storage, for example, the Small Computer Systems Interface (SCSI) protocol encapsulated over TCP (iSCSI) and SCSI encapsulated over Fibre Channel (FC), object-based protocol or any other protocol.

In a typical mode of operation, one or more input/output (I/O) requests from the virtualization environments 102 are sent over the interconnectivity fabric 108 to the storage system 106. The I/O requests are received by the storage system 106, where one or more I/O commands are issued to the storage devices 120 to read or write the data on behalf of the requesting entities. Response to the I/O requests are then transmitted back to the requesting entities over the interconnectivity fabric 108.

Although the storage system 106 is shown as a standalone system, i.e., a non-cluster-based system, in other embodiments, the storage system 106 may have a distributed architecture; for example, a cluster-based system that may include a separate network module and storage module. Briefly, the network module is used to communicate with the requesting entities, while the storage module is used to communicate with the storage devices 120.

Alternatively, the storage system 106 may have an integrated architecture, where the network and data components are included within a single chassis. The storage system 106 may further be coupled through a switching fabric to other similar storage systems (not shown), which have their own local storage devices. In this way, all the storage devices can form a single storage pool, to which any client of any of the storage servers has access.

In the illustrated embodiment, the storage system 106 includes a sequential packing (SP) module 128 and a garbage collecting-repacking (GC-repacking or GC-R) module 130, which are included in the storage manager 126. However, these modules may be standalone units or part of another component in the storage system. In some embodiments, these modules may be software modules running on one or more physical and/or virtual computer systems. As explained below, the sequential packing module is programmed or configured to execute operations related to a sequential packing process, and the GC-repacking module is programmed or configured to execute operations related to identifying garbage collectible data and repacking stored data. In other embodiments, the functionality of these module may be executed by other components in the networked storage system 100.

In an embodiment, the storage system 106 uses a sequential packing technique to store data, e.g., compressed data, in fixed extents or fixed size disk blocks in the storage devices

120. As an example, the storage system may be designed to store data in 4 kilobyte (KB) size disk blocks. In a conventional fixed extent storage system, compressed data is divided into the size of the disk blocks. Any remaining portion of the compressed data that is smaller than the disk block size is stored in a disk block, which may leave a significant amount of the disk block space unused, creating a partially filled disk block. As more compressed data segments are stored in the disk blocks, the number of partially filled disk blocks would increase, which means storage efficiency (SE) would decrease. As used herein, SE is a measure of how much actual physical space is needed to store a set of data. By using the sequential packing technique in accordance with embodiments of the invention, the unused disk block space can be significantly reduced or even eliminated, which results in higher SE.

Figure 3:
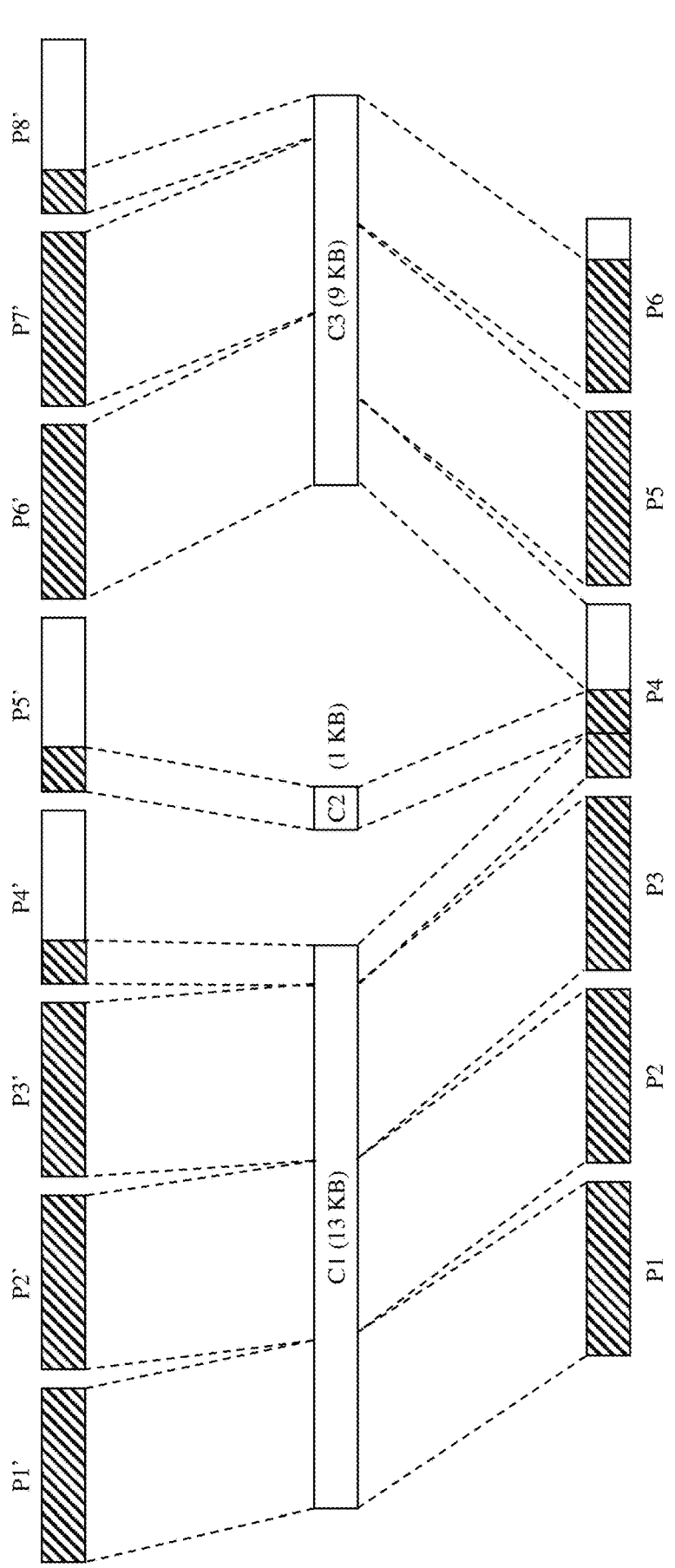
FIG. 3 illustrates an example of the potential disk savings using a sequential packing technique in accordance with embodiments of the invention.

An example of the potential disk savings using the sequential packing technique in accordance with embodiments of the invention is illustrated in FIG. 3. In this example, there are three (3) compressed data segments C1, C2 and C3, which are the results of four-to-one (4:1) compression, that need to be stored in 4 KB disk blocks. The first compressed data segment C1 is the result of 52 KB of data being compressed to 13 KB, the second compressed data segment C2 is the result of 4 KB of data being compressed to 1 KB, and the third compressed data segment C3 is the result of 36 KB of data being compressed to 9 KB.

Using a conventional data packing technique, the compressed data segments C1, C2 and C3 are stored in disk blocks P1', P2', P3', P4', P5', P6', P7' and P8' such that only data from a single compressed data segment is stored in any given disk block, as illustrated in FIG. 3. Since the disk blocks are 4 KB in size, the first compressed data segment C1 is stored in the four disk blocks P1', P2', P3' and P4'. The disk blocks P1', P2' and P3' are each filled with 4 KB of the first compressed data segment C1. The disk block P4' is partially filled with 1 KB of the first compressed data segment C1. The second compressed data segment C2 is stored in the disk block P5', which is partially filled with 1 KB of the second compressed data segment C2. The third compressed data segment C3 is stored in the three disk blocks P6', P7' and P8'. The disk blocks P6' and P7' are each filled with 4 KB of the third compressed data segment C3. The disk block P8' is partially filled with 1 KB of the third compressed data segment C3.

Thus, using the conventional data packing technique, even though 92 KB of data was compressed into 23 KB compressed data (4:1 ratio), 32 KB (~3:1 ratio) of disk space was used (eight (8) 4 KB disk blocks) to store the 23 KB compressed data. Thus, in effect, the results are more like the results of a three-to-one (3:1) compression rather than the results of a four-to-one (4:1) compression.

Using the sequential data packing technique in accordance with an embodiment of the invention, the same compressed data segments C1, C2 and C3 can be stored in fewer disk blocks by allowing compressed data from more than one compressed data segment to be stored in a single disk block. As illustrated in FIG. 3, the compressed data segments C1, C2 and C3 can be stored in six (6) disk blocks P1, P2, P3, P4, P5 and P6. The first compressed data segment C1 is stored in the four disk blocks P1, P2, P3 and P4, which is similar to the conventional data packing technique. The disk blocks P1, P2 and P3 are each filled with 4 KB of the first compressed data segment C1. The disk block P4 is partially filled with 1 KB of the first compressed data segment C1. The second compressed data segment C2 is stored in the disk block P4, which had 3 KB of unused disk block space. Thus, the disk block P4 is additionally filled with 1 KB of the second compressed data segment C2. The third compressed data segment C3 is stored in three disk blocks P4, P5 and P66. 2 KB of the third compressed data segment C3 is stored in the disk block P4, which had 2 KB of space remaining after being additionally filled with 1 KB of the second compressed data segment C2. The remaining 7 KB of the third compressed data segment C3 is stored in the disk blocks P5 and P6 such that the disk block P5 is filled with 4 KB of the third compressed data segment C3 and the disk block P6 is partially filled with 3 KB of the third compressed data segment C3.

Thus, using the sequential data packing technique, 26 KB of compressed data can be stored in six (6) 4 KB disk blocks. In this example of the compressed data segments C1, C2 and C3, compared to the conventional data packing technique, the wasted or unused disk block space is reduced from 9 KB to just 1 KB. The actual wasted space reduction will depend on the particular sizes of the compressed data segments being contiguously written into the disk blocks. It is also noted here that some minimal space in each disk block may be needed to include metadata regarding the data stored in the disk block, such as the compressed data segment(s) stored in that disk block.

The sequential data packing technique in accordance with embodiments of the invention may be particularly helpful for highly compressible dataset in the range between eight-to-one (8:1) and sixteen-to-one (16:1) compression ratios. For such datasets, using the conventional data packing technique, better than 8:1 ratio cannot be achieved because each compressed data segment is typically between 2048 bytes to 4096 bytes, which will always consume one whole disk block. Consider a case of twelve-to-one (12:1) compressed data, where 32 KB of data gets compressed to ~2730 bytes. In this case, for each compressed data segment, approximately 1366 bytes of 4 KB disk block space will get wasted. With the sequential data packing technique, three such compressed data segments can be written in two 4 KB disk blocks. Specifically, the first compressed data segment will use 2730 bytes from the first disk block, the second compressed data segment will use 1366 bytes from first disk block and 1364 bytes from second disk block, and the third compressed data segment C3 will use 2730 bytes from the second disk block. Hence, the expected 12:1 SE ratio can be achieved.

Figure 4:
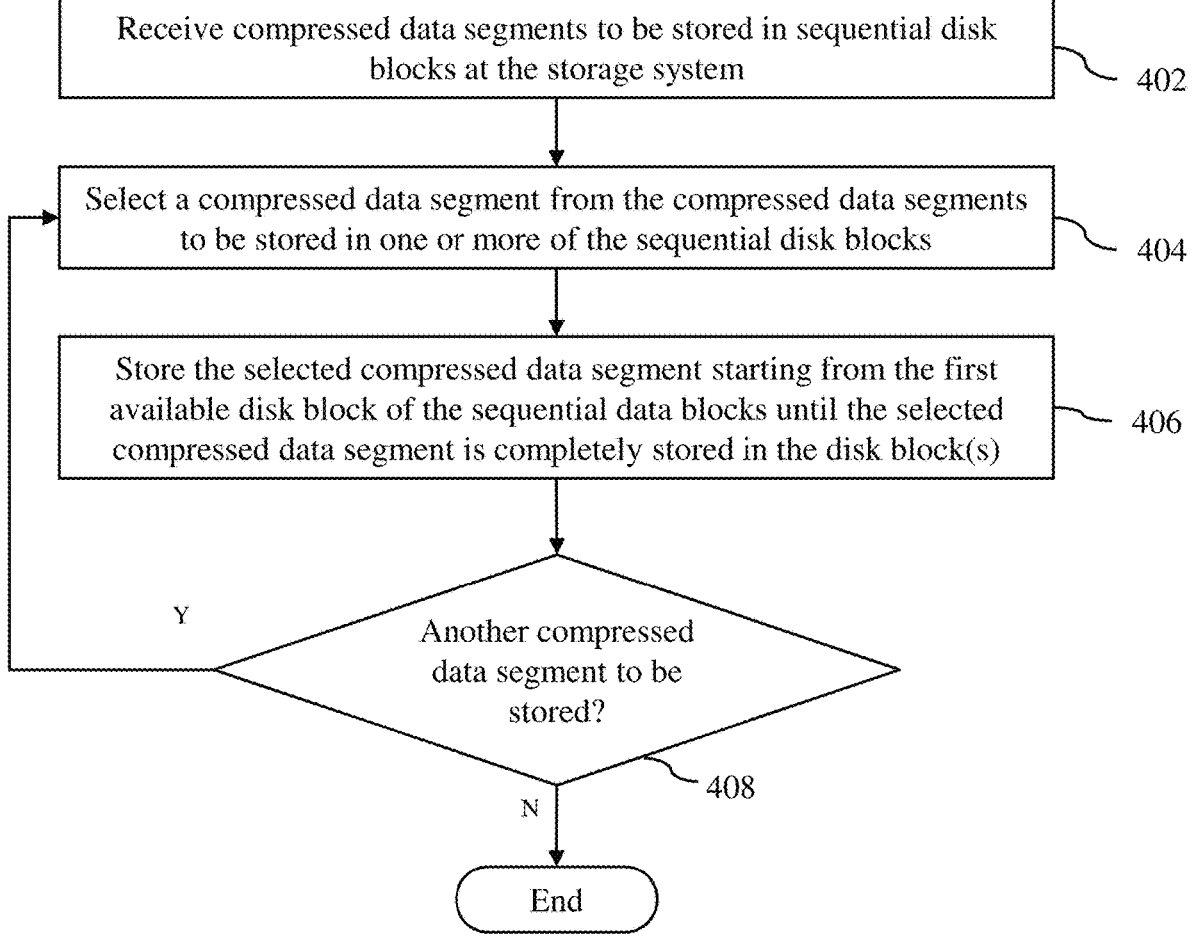
FIG. 4 is a flow diagram of a sequential packing process in accordance with an embodiment of the invention.

Turning now to FIG. 4, a flow diagram of a sequential packing process in accordance with an embodiment of the invention is shown. The process begins at step 402, where compressed data segments to be stored in sequential disk blocks are received at the storage system 106. In an embodiment, these sequential disk blocks are each fixed in size, e.g., 4 KB. The compressed data segments may be from the VMs 112 running in the virtualization environments 102, where data may have been compressed in containers to form the compressed data segments.

Next, at step 404, a compressed data segment is selected from the compressed data segments by the sequential packing module 128 to be stored in one or more of the sequential disk blocks. The selection of the compressed data segment to be processed may be based on the order in which the compressed data segments are received at the storage system 106.

Next, at step 406, the selected compressed data segment is stored by the sequential packing module 128 starting from the first available disk block of the sequential disk blocks, which may already be partially filled with data from the previous compressed data segment, until the selected compressed data segment is completely stored in the disk block(s). If the selected compressed data segment is smaller than the size of a single disk block, then the selected compressed data segment may only be stored in the first available disk, creating a compressed data extent (CDE) of size one (1). As used herein, a CDE is a compressed data segment stored in one or more contiguous disk blocks. Depending on the size of the selected compressed data segment, the last disk block used to store the selected compressed data segment may be partially filled. This last disk block can then be used to store the next compressed data segment. In an embodiment, for each disk block used to store the compressed data segment, a header of a disk block is modified or created to include information regarding the compressed data.

Next, at step 408, a determination is made by the sequential packing module 128 whether there is another compressed data segment to be stored. If there is another compressed data segment to be stored, then the process proceeds back to step 404 to select the next compressed data segment to be stored. However, if there is no additional compressed data segment to be stored, then the process comes to an end.

Although the described sequential data packing technique may significantly increase the SE, it is possible that, over a period of time, the benefits of sequential data packing may decrease because certain file operations, such as overwrites, holepunches and/or file deletes, can cause some of the sequentially packed CDEs, i.e., compressed data segments stored in one or more fixed size disk blocks, to be holepunched, which may leave some overlapping disk blocks with unused spaces. As used herein, an overlapping disk block is a disk block that contains data from multiple compressed data segments, whereas a non-overlapping disk block is a disk block that contains data from a single compressed data segment. An overlapping disk block cannot be reclaimed until all the CDEs that are part of the overlapped disk blocks are freed or garbage collected. Thus, CDEs that are not garbage collectible can be repacked to regain at least some of the SE lost due to the certain file operations, as described below.

In order to determine whether a CDE is garbage collectible, a reference count value of the CDE, which is a number of references made to the CDE (e.g., the compressed data of the CDE), is used. In a particular implementation, a field in a header of each disk block may be used to store a current reference count value of that disk block. The current reference count value of a disk block represents the current reference count values of all the CDEs that are stored in that disk block. When there is only one CDE stored in the disk block, then the current reference count value for the disk block is the current reference count value for that one CDE. However, when there are more than one CDE stored in a disk block, i.e., an overlapping disk block, then the current reference count value for the disk block is the sum of the current reference count values for all the CDEs stored in the disk block. For example, if an overlapping disk block includes a first CDE with a current reference count value of six (6) and a second CDE with a current reference count value of five (5) stored in the disk block, then the current reference count value for the disk block will be eleven (11). Thus, by looking only at the current reference count value of the disk block, it is not possible to determine the current reference count values for the first and second CDEs.

When a conventional data packing technique is used, a garbage collectible CDE can be readily identified by reading the current reference count value in the disk block since each disk block is associated with a single CDE. However, when a sequential data packing technique is used, the existence of overlapping disk blocks presents a challenge in identifying which CDEs are garbage collectible using the current refence count values of the disk blocks, as explained above.

In an embodiment, when an CDE has any number of disk blocks and at least one disk block on which the CDE is stored is a non-overlapping disk, the current reference count value of the non-overlapping disk block is used to determine the current reference count value of the CDE. For example, even when a CDE is stored in a single disk block, i.e., a CDE with an extent size of 1, if the disk block is a non-overlapping disk block, then the current reference count value of the non-overlapping disk block is the current reference count value of the CDE. As another example, if a CDE is stored in multiple disk blocks, i.e., a CDE with an extent size equal to two (2) or more, then the current reference count value of a non-overlapping disk block on which the CDE is stored is the current reference count value of the CDE.

However, when an CDE has an extent size of one (1) or two (2) and each disk block on which the CDE is stored is an overlapping disk, there is no non-overlapping disk block to be used to determine the current reference count value of the CDE. For such a CDE, the current reference count value of the CDE can be computed by subtracting the current reference count values of the other CDEs stored in the disk block from the current reference count value of the disk block. Thus, if there are n number of CDEs (i.e., $CDE_1 \cdots CDE_n$) stored in an overlapping disk block, where n is greater than two (2), the current reference count value of a CDE can computed using the following equation:

$$Refcount(CDE) = \quad\quad\quad\quad\quad\quad\quad (Eq.\ 1)$$

$$Refcount(\text{disk block}) - Refcount(CDE_1) - \ldots\ Refcount(CDE_{n-1}),$$

where Refcount( ) is the current reference count value of ( ) and disk block is the overlapping disk block.

In an embodiment, once the current reference count values of the CDEs are determined, then a threshold reference count value can be used to determine which CDEs are garbage collectible. As an example, if the threshold value is two (2), then all CDEs with a current reference count value equal to or less than two (2) may be determined to be garbage collectible.

The process of determining the current reference count values of the CDEs in order to identify garbage collectible CDEs in accordance with an embodiment of the invention is further described using the example illustrated in FIG. 3. After the CDEs or compressed data segments C1, C2 and C3 have been sequentially packed in the disk blocks P1, P2, P3, P4, P5 and P6, the CDEs C1, C2 and C3 are stored in the disk blocks, as follows:

| | |
|---|---|
| C1 | P1, P2, P3 and P4 |
| C2 | P4 |
| C3 | P4, P5, P6 |

Thus, the CDE C1 is packed in the disk blocks P1, P2, P3 and P4, the CDE C2 is packed in the disk block P4, and the CDE C3 is packed in the disk blocks P4, P5 and P6. In this example, only the disk block P4 is an overlapping disk block. The disk blocks P1, P2, P3, P5 and P6 are non-overlapping disk blocks. Thus, the current reference count values for the disk blocks P1, P2, P3, P4, P5 and P6 are as follows:

| Disk Block | P1 | P2 | P3 | P4 | P5 | P6 |
|---|---|---|---|---|---|---|
| Reference Count Value | 8 | 8 | 8 | 24 | 8 | 8 |

For this scenario, the current reference count value of the CDE C1 can be determined by looking for a non-overlapping disk block in which the CDE C1 is stored. In this example, the disk blocks P2 and P3 are the non-overlapping disk blocks in which the CDE C1 is stored. Thus, the current reference count value of the CDE C1 is the current reference count value of the disk block P2 or P3, which is eight (8).

However, the current reference count value of the CDE C2 cannot be determined by looking for a non-overlapping disk block in which the CDE C2 is stored because the CDE C2 is only stored in the overlapping disk block P4. Consequently, the current reference count value of the CDE C2 needs to be determined by first getting the current reference count values of any other CDEs sharing the overlapping disk block P4 with the CDE C2. Thus, the current reference count value of the CDE C2 will be computed after the current reference count value of the CDE C3 is determined.

Similar to the CDE C1, the current reference count value of the CDE C3 can be determined by looking for a non-overlapping disk block in which the CDE C3 is stored. In this example, the disk block P5 is a non-overlapping disk block in which the CDE C3 is stored. Thus, the current reference count value of the CDE C3 is the current reference count value of the disk block P5, which is eight (8).

Returning to the CDE C2, the current reference count value of the CDE C2 can be determined using Equation 1. For the CDE C2, the equation is:

$$Refcount(C2) =$$

$$Refcount(P4) - Refcount(C1) - Refcount(C3) = 24 - 8 - 8 = 8.$$

Thus, the current reference count value of the CDE C2 is determined to be eight (8). Now, the current reference count value of each of the three CDEs C1, C2 and C3 has been determined, which can be used to determine whether each of the CDEs C1, C2 and C3 is garbage collectible.

Continuing with the example, let's assume that there have been two (2) overwrites for the CDE C1, one (1) overwrite for the CDE C2, and three (3) overwrites for the CDE C3. Then, the current reference count values for the disk blocks P1, P2, P3, P4, P5 and P6 will then be as follows:

| Disk Block | P1 | P2 | P3 | P4 | P5 | P6 |
|---|---|---|---|---|---|---|
| Reference Count Value | 6 | 6 | 6 | 18 | 5 | 5 |

Now, the current reference count value of the CDE C1 can be determined to be six (6) by looking at the disk block P2 or P3, which are the non-overlapping disk blocks in which the CDE C1 is stored. Similarly, the current reference count value of the CDE C3 can be determined to be six (6) by looking at the disk block P5, which is the non-overlapping disk block in which the CDE C3 is stored. Lastly, the current reference count value of the CDE C2 can again be determined using Equation 1 as follows:

$$Refcount(C2) =$$

$$Refcount(P4) - Refcout(C1) - Refount(C3) = 18 - 6 - 5 = 7.$$

Thus, the current reference count value of the CDE C2 is determined to be seven (7). Now, the current reference count value of each of the three CDEs C1, C2 and C3 has been determined, which can be used to determine whether the CDEs C1, C2 and C3 garbage collectible by seeing whether the current reference count value for a particular CDE is equal to or less than a threshold reference count value, e.g., a value of two (2).

Figure 5:
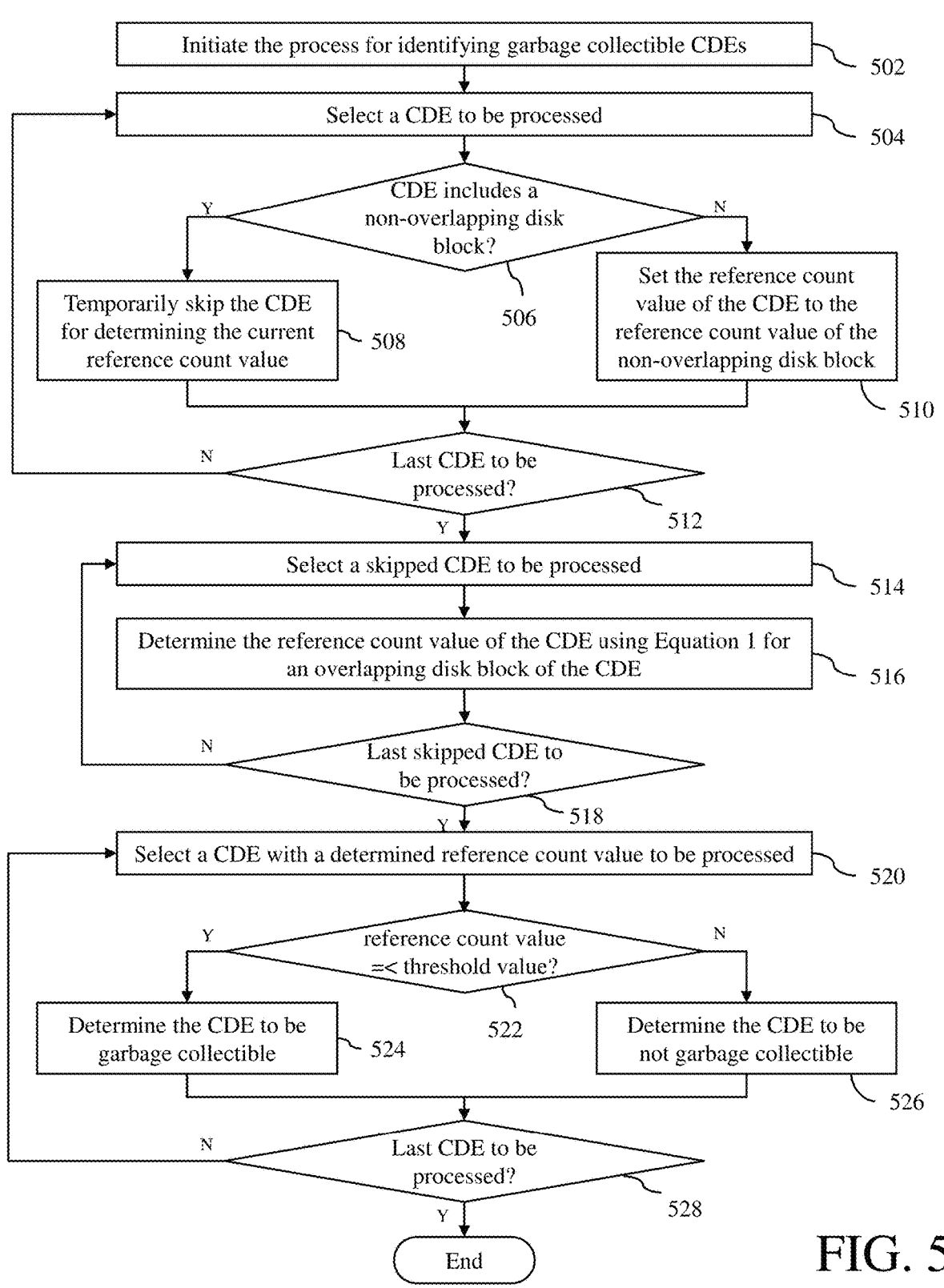
FIG. 5 is a flow diagram of a process for identifying garbage collectible compressed data extents (CDEs) in accordance with an embodiment of the invention.

Turning now to FIG. 5, a flow diagram of a process for identifying garbage collectible CDEs (i.e., compressed data segments stored in one or more disk blocks) in accordance with an embodiment of the invention is shown. The process begins at step 502, where the process for identifying garbage collectible CDEs is initiated. In an embodiment, this process may be periodically initiated by the GC-repacking module 130 or manually initiated by a user using a user interface associated with the GC-repacking module. Next, at step 504, a CDE is selected to be processed by the GC-repacking module. In an embodiment, a CDE may be found by looking at the header of each disk block to determine the first block in which the CDE is stored.

Next, at step 506, a determination is made by the GC-repacking module 130 whether the CDE includes a non-overlapping disk block. If the CDE does not have a non-overlapping disk block, the process proceeds to step 508, temporarily skipping the CDE for determining the current reference count value for that CDE. However, if the CDE has a non-overlapping disk block, the process proceeds to step 510, where the reference count value of the CDE is set to the reference count value of the non-overlapping disk block. That is, the reference count value of the CDE is determined to be the reference count value of the non-overlapping disk. The process then proceeds to step 512.

At step 512, a determination is made by the GC-repacking module 130 whether the current CDE is the last CDE to be processed for the current iteration. If the current CDE is not the last CDE to be processed for the current iteration, the process proceeds back to step 504 to select the next CDE. If the current CDE is the last CDE for the current iteration, the process then proceeds step 514.

At step 514, a CDE without a determined reference count value (i.e., a skipped CDE) is selected to be processed by the GC-repacking module 130. Next, at step 516, the reference count value of the CDE is determined using Equation 1 for an overlapping disk block of the CDE, i.e., Refcount(CDE) =Refcount(disk block)−Refcount($CDE_1$) . . . Refcount ($CDE_{n-1}$). Next, at step 518, a determination is made by the GC-repacking module whether the current skipped CDE is the last skipped CDE to be processed for the current iteration. If the current skipped CDE is not the last CDE to be processed for the current iteration, the process proceeds back to step 514 to select the next skipped CDE. If the current skipped CDE is the last skipped CDE for the current iteration, the process then proceeds step 520.

At step 520, a CDE with a determined reference count value is selected to be processed by the GC-repacking module 130. Next, at step 522, determination is made by the GC-repacking module whether the reference count value of the CDE is equal to or less than a threshold value, e.g., two (2). If the reference count value of the CDE is equal to or less than the threshold value, the process proceeds to step 524, where the CDE is determined to be garbage collectible by the GC-repacking module. The process then proceeds to step 528. However, if the reference count value of the CDE is not equal to or less than the threshold value, the process proceeds to step 526, where the CDE is not determined to be garbage collectible by the GC-repacking module. The process then proceeds to step 528.

At step 528, a determination is made by the GC-repacking module 130 whether the current CDE is the last CDE with a determined reference count value to be processed for garbage collectible determination. If the current CDE is not the last CDE to be processed for garbage collectible determination, the process proceeds back to step 520 to select the next CDE with a determined reference count value to be processed. If the current CDE is the last CDE with a determined reference count value for garbage collectible determination, the process then comes to an end.

As noted above, apart from garbage collection, it is possible that over a period of time, the benefit of sequential packing decreases because overwrites, holepunch and file deletes cause some of the sequentially packed CDEs to be holepunched or broken with spaces in between some of the remaining CDEs. However, an overlapping disk block cannot be reclaimed until all the CDEs that are part of the overlapping disk block are freed or garbage collected. Thus, it may be beneficial to sequentially repack one or more CDEs as spaces are created between the sequentially packed CDEs.

Garbage collection and repacking can be thought of as an integrated work to improve SE ratio after overwrites, holepunch and/or file deletes have occurred. Repacking is also important because with sequential packing, it is possible that a CDE might occupy one more disk block compared to what that CDE would have occupied without sequential packing. Hence, even though initial savings were higher with sequential packing, after some time, the savings might be reduced to a level even below what would have been achieved without sequential packing.

As used herein, a repackable sequential CDE chunk is a sequential CDE chunk comprising one or more CDEs, which are stored contiguous disk blocks that include fragmented or partially used disk blocks. These partially used disk blocks may include first and/or last disk blocks of sequential CDE chunks. When a CDE of size one (1) is involved, the partially used disk blocks may include middle disk blocks of sequential CDE chunks.

If CDEs are not repacked, eventually the benefits of sequential packing are reduced. However, repacking also has a cost associated with it because of reading and moving the CDE data. In addition, repacking might turn out to be not as useful because some of the CDEs that got repacked may get overwritten and freed, or may become garbage collection eligible. Furthermore, the benefits of repacking diminishes when the sequential CDE chunk is larger. For example, if there is a sequential CDE chunk of two (2) disk blocks with the first disk block fragmented, repacking will provide 25% savings on average. However, if the sequential CDE chunk is of size ten (10) disk blocks, then the savings are just 5%.

Thus, in an embodiment, if a sequential CDE chunk that is repackable has size equal to or smaller than certain threshold size, then that sequential CDE chunk will be recommended to be repacked immediately in one or more new disk blocks because the savings gain is larger and the cost of movement is smaller. The value of the threshold size may be adjusted as needed. As an example, the threshold size may be three (3) disk blocks for a sequential CDE chunk associated with only one overlapping disk block on a single side (referred to herein as a single-overlapping sequential CDE chunk), and four (4) disk blocks for a sequential CDE chunk associated with overlapping disk blocks on both sides (referred to herein as a double-overlapping sequential CDE chunk). However, the threshold size for single-overlapping sequential CDE chunks or for double-overlapping sequential CDE chunks may be any designated number.

In addition to the use of threshold sizes for repackable sequential CDE chunks, a threshold for an aggregate number of repackable sequential CDE chunks may be used to repack the sequential CDE chunks even though those sequential CDE chunks are not small enough to have been recommended for immediate repacking. Thus, once the number of repackable sequential CDE chunks crosses above certain threshold, e.g., equal to or greater than a threshold number, which may be three (3), six (6) or a larger number, the repackable sequential CDE chunks will be recommended for repacking, independent of the size of the sequential CDE chunks, i.e., all potential sequential CDE chunks should now be repacked in new disk blocks using the sequential packing process described above. In an embodiment, the repacking one or more potential sequential CDE chunks involves packing the chunks in one or more new disk blocks without decompressing the compressed data of the CDEs.

Figure 6:
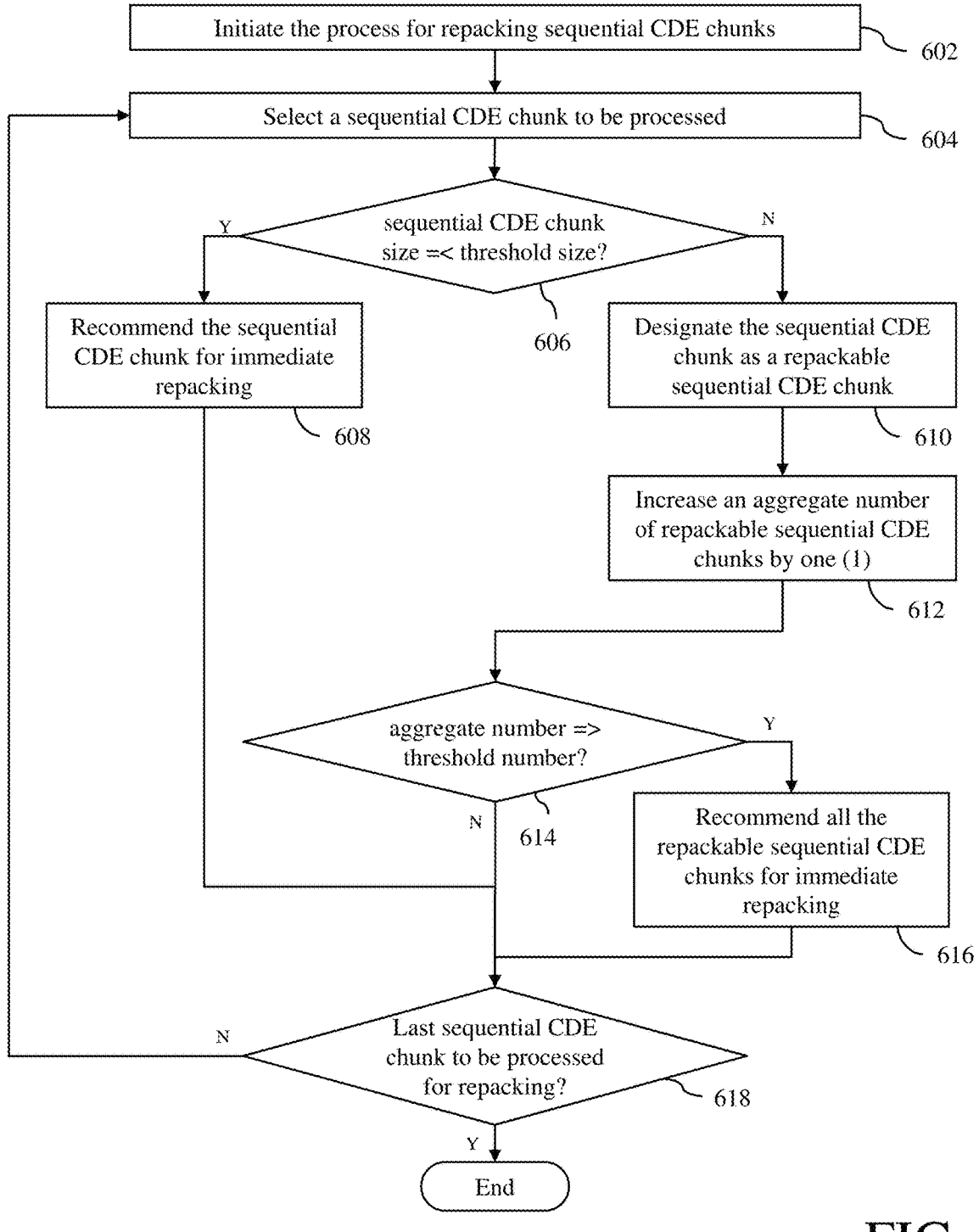
FIG. 6 is a flow diagram of a process for repacking sequential CDE chunks in accordance with an embodiment of the invention.

Turning now to FIG. 6, a flow diagram of a process for repacking sequential CDE chunks in accordance with an embodiment of the invention is shown. The process begins at step 602, where the process for repacking sequential CDE chunks is initiated. In an embodiment, this process may be periodically initiated by the GC-repacking module 130 or manually initiated by a user using a user interface associated with the GC-repacking module. Next, at step 604, a sequential CDE chunk is selected to be processed by the GC-repacking module. In an embodiment, a sequential CDE chunk may be determined by looking at the headers of relevant disk blocks for partially filled disk blocks to determine a sequential CDE chunk, which may be a single-overlapping sequential CDE chunk or a double-overlapping sequential CDE chunk.

Next, at step 606, a determination is made by the GC-repacking module 130 whether the size of the sequential CDE chunk is equal to or smaller than a threshold size, which can be different depending on whether the sequential CDE chunk is a single-overlapping sequential CDE chunk or a double-overlapping sequential CDE chunk. If the sequential CDE chunk is equal to or smaller than the relevant threshold size, then the process proceeds to step 608, where the sequential CDE chunk is recommended for immediate repacking. In an embodiment, the repacking of the sequential CDE chunk may be executed by the sequential packing module 128. However, in other embodiments, the repacking of the sequential CDE chunk may be executed by the GC-repacking module or another entity, which may be a software process or application. The process then proceeds to step 618.

However, if the sequential CDE chunk is not equal to or smaller than the relevant threshold size, then the process proceeds to step 610, where the sequential CDE chunk is not recommended for immediate repacking and designated as a repackable sequential CDE chunk. Next, at step 612, an aggregate number of repackable sequential CDE chunks (i.e., the total number of sequential CDE chunks that are not recommended for immediate repacking) is increased by one (1).

Next, at step 614, a determination is made by the GC-repacking module 130 whether the aggregate number of repackable sequential CDE chunks is equal to or greater than a threshold number. If the aggregate number of repackable sequential CDE chunks is not equal to or greater than the threshold number, then the process proceeds to step 618. However, if the aggregate number of repackable sequential CDE chunks is equal to or greater than the threshold number, then the process proceeds to step 616, where all the repackable sequential CDE chunks are now recommended for immediate repacking. In an embodiment, the repacking of the repackable sequential CDE chunks may be executed by the sequential packing module, the GC-repacking module or another entity. The process then proceeds to step 618.

At step 618, a determination is made by the GC-repacking module 130 whether the current sequential CDE chunk is the last sequential CDE chunk to be processed for repacking. If the sequential CDE chunk is not the last sequential CDE chunk to be processed, the process proceeds back to step 604 to select the next sequential CDE chunk. If the current sequential CDE chunk is the last sequential CDE chunk for repacking, the process then comes to an end.

Figure 7:
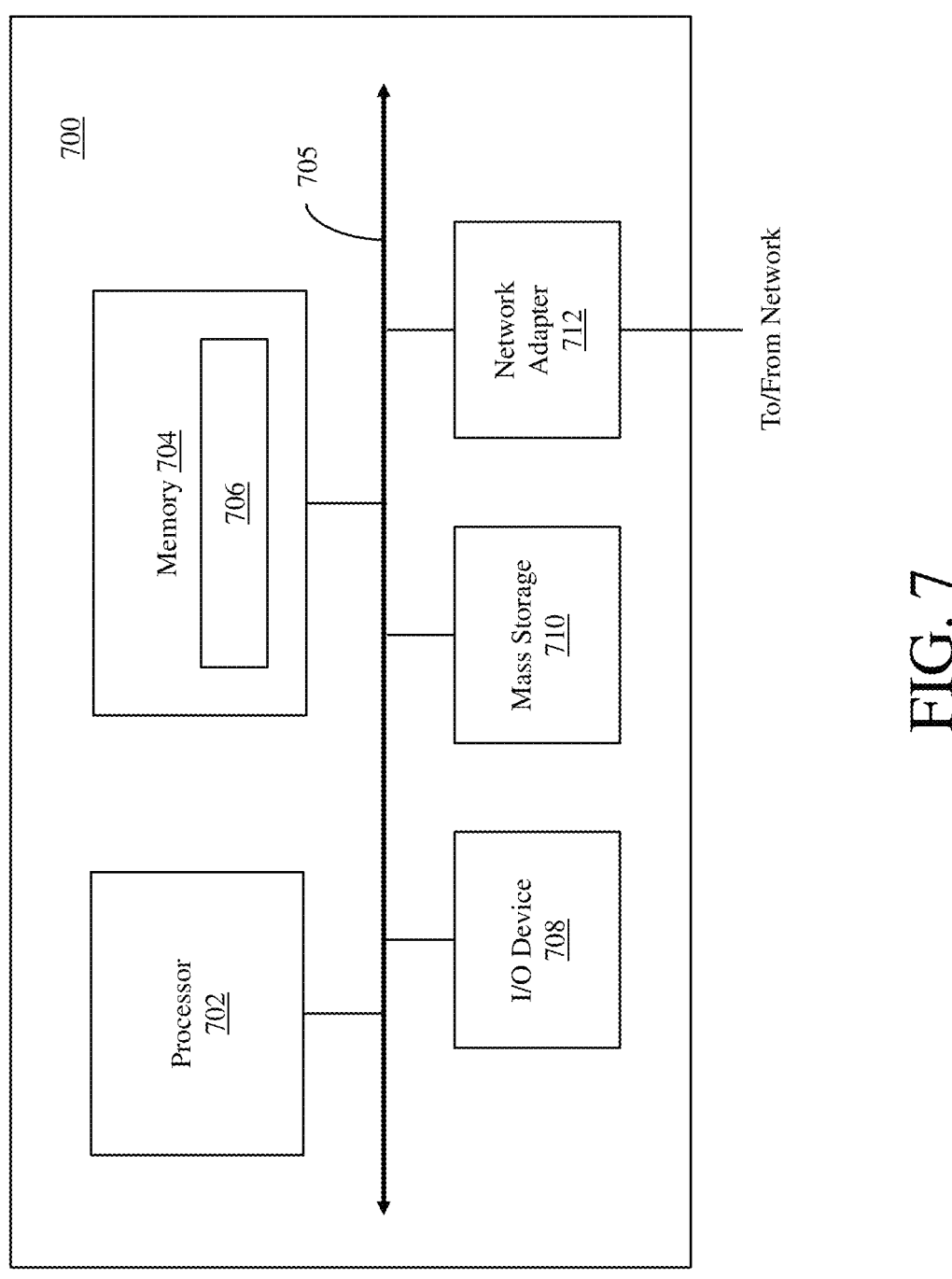
FIG. 7 is a high-level block diagram showing an example of the architecture of a processing system in accordance with an embodiment of the invention.

FIG. 7 is a high-level block diagram showing an example of the architecture of a processing system 700 in accordance with an embodiment of the invention, in which executable instructions for operations as described above can be implemented. The processing system 700 can represent modules of the virtualization environments 102, the storage system 106 and the storage interface appliance 110. Note that certain standard and well-known components which are not germane to the present invention are not shown in FIG. 7.

The processing system 700 includes one or more processors 702 and memory 704, coupled to a bus system 705. The bus system 705 shown in FIG. 7 is an abstraction that represents any one or more separate physical buses and/or point-to-point connections, connected by appropriate bridges, adapters and/or controllers. The bus system 705, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 702 are the central processing units (CPUs) of the processing system 700 and, thus, control its overall operation. In certain aspects, the processors 702 accomplish this by executing programmable instructions stored in the memory 704. Each processor 702 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 704 represents any form of random-access memory (RAM), read-only memory (ROM), flash memory, or the like, or a combination of such devices. The memory 704 includes the main memory of the processing system 700. Instructions 706 which implements techniques introduced above may reside in and may be executed by the processors 702 from the memory 704. For example, the instructions 706 may include code used for executing the steps of FIGS. 4, 5 and 6 as well running various applications/processes running in the networked storage system

100, such as the data center management servers 104, the VMs 112, the storage interface appliance 110 and the storage manager 126, including the sequential packing module 128 and the GC-repacking module 130.

Also connected to the processors 702 through the bus system 705 are one or more internal mass storage devices 710, and a network adapter 712. The internal mass storage devices 710 may be or may include any conventional medium for storing large volumes of data in a non-volatile manner, such as one or more magnetic or optical based disks. The network adapter 712 provides the processing system 700 with the ability to communicate with remote devices (e.g., storage servers) over a network and may be, for example, an Ethernet adapter, a Fibre Connector (FC) adapter, or the like. The processing system 700 also includes one or more input/output (I/O) devices 708 coupled to the bus system 705. The I/O devices 708 may include, for example, a display device, a keyboard, a mouse, etc.

Figure 8:
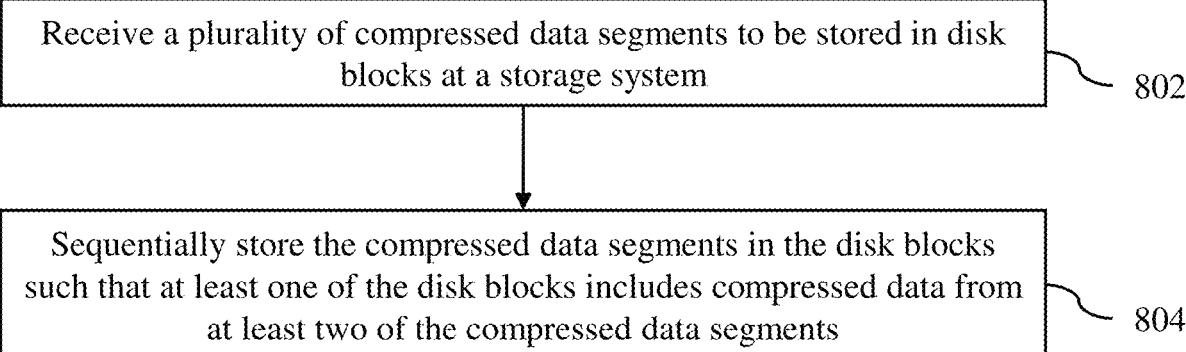
FIG. 8 is a process flow diagram of a method executed by one or more processors in accordance with an embodiment of the invention.

A method executed by one or more processors in accordance with an embodiment of the invention is now described with reference to a flow diagram of FIG. 8. At block 802, a plurality of compressed data segments to be stored in disk blocks is received at a storage system. At block 804, the compressed data segments are sequentially stored in the disk blocks such that at least one of the disk blocks includes compressed data from at least two of the compressed data segments.

Methods and apparatus for centralized authentication and/or authorization for a microservice-based system have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

Similarly, reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method executed by one or more processors, comprising:

receiving a plurality of compressed data segments to be stored in disk blocks at a storage system;

sequentially storing the compressed data segments in the disk blocks such that at least one of the disk blocks includes compressed data from at least two of the compressed data segments;

using a reference count value of a compressed data segment stored in at least one of the disk blocks to determine whether the compressed data segment is garbage collectible, wherein the reference count value is a number of references made to the compressed data segment;

determining that the compressed data segment is stored in a non-overlapping disk block, wherein the non-overlapping disk block is a disk block having data from a single compressed data segment; and setting the reference count value of the compressed data segment as a reference count value of the non-overlapping disk block.

2. The method of claim 1, wherein the disk blocks are fixed size disk blocks, where a size of each disk block is same.

3. The method of claim 1, further comprising:

determining that another compressed data segment is not stored in a non-overlapping disk block; and setting the reference count value of the another compressed data segment as a reference count value of an overlapping disk block minus a reference count value of each of all other compressed data segments stored in the overlapping disk block, wherein the overlapping disk block is a disk block having data from multiple compressed data segments.

4. The method of claim 1, further comprising:

determining that a size of a sequential compressed data chunk stored in the disk blocks is equal to or smaller than a threshold size, the sequential compressed data chunk including one or more of the compressed data segments stored in the disk blocks; and repacking the sequential compressed data chunk in one or more new disk blocks.

5. The method of claim 4, wherein the threshold size is a first threshold size when the sequential compressed data chunk involves an overlapping disk block only on one side and is a second threshold size when the sequential compressed data chunk involves overlapping disk blocks on both sides, wherein the overlapping disk block is a disk block having data from multiple compressed data segments.

6. The method of claim 1, further comprising:

determining that a size of a sequential compressed data chunk stored in the disk blocks is larger than a threshold size, the sequential compressed data chunk including one or more of the compressed data segments stored in the disk blocks; and outputting a recommendation that the sequential compressed data chunk be repacked when an aggregate number of other sequential compressed data chunks with a same recommendation is equal to or greater than a threshold number.

7. A non-transitory computer-readable storage medium containing program instructions, wherein execution of the program instructions by one or more processors of a computer causes the one or more processors to perform steps comprising:

receiving a plurality of compressed data segments to be stored in disk blocks at a storage system;

sequentially storing the compressed data segments in the disk blocks such that at least one of the disk blocks includes compressed data from at least two of the compressed data segments;

using a reference count value of a compressed data segment stored in at least one of the disk blocks to determine whether the compressed data segment is garbage collectible, wherein the reference count value is a number of references made to the compressed data segment;

determining that the compressed data segment is stored in a non-overlapping disk block, wherein the non-overlapping disk block is a disk block having data from a single compressed data segment; and setting the reference count value of the compressed data segment as a reference count value of the non-overlapping disk block.

8. The non-transitory computer-readable storage medium of claim 7, wherein the disk blocks are fixed size disk blocks, where a size of each disk block is same.

9. The non-transitory computer-readable storage medium of claim 7, wherein the steps further comprise:

determining that another compressed data segment is not stored in a non-overlapping disk block; and setting the reference count value of the another compressed data segment as a reference count value of an overlapping disk block minus a reference count value of each of all other compressed data segments stored in the overlapping disk block, wherein the overlapping disk block is a disk block having data from multiple compressed data segments.

10. The non-transitory computer-readable storage medium of claim 7, wherein the steps further comprise:

determining that a size of a sequential compressed data chunk stored in the disk blocks is equal to or smaller than a threshold size, the sequential compressed data chunk including one or more of the compressed data segments stored in the disk blocks; and repacking the sequential compressed data chunk in one or more new disk blocks.

11. The non-transitory computer-readable storage medium of claim 10, wherein the threshold size is a first threshold size when the sequential compressed data chunk involves an overlapping disk block only on one side and is a second threshold size when the sequential compressed data chunk involves overlapping disk blocks on both sides, wherein the overlapping disk block is a disk block having data from multiple compressed data segments.

12. The non-transitory computer-readable storage medium of claim 7, wherein the steps further comprise:

determining that a size of a sequential compressed data chunk stored in the disk blocks is larger than a threshold size, the sequential compressed data chunk including one or more of the compressed data segments stored in the disk blocks; and outputting a recommendation that the sequential compressed data chunk be repacked when an aggregate number of other sequential compressed data chunks with a same recommendation is equal to or greater than a threshold number.

13. A system comprising:

memory; and at least one processor configured to:

receive a plurality of compressed data segments to be stored in disk blocks at a storage system;

sequentially store the compressed data segments in the disk blocks such that at least one of the disk blocks includes compressed data from at least two of the compressed data segments;

use a reference count value of a compressed data segment stored in at least one of the disk blocks to determine whether the compressed data segment is garbage collectible, wherein the reference count value is a number of references made to the compressed data segment;

determine that the compressed data segment is not stored in a non-overlapping disk block, wherein the non-overlapping disk block is a disk block having data from a single compressed data segment; and set the reference count value of the compressed data segment as a reference count value of an overlapping disk block minus a reference count value of each of all other compressed data segments stored in the overlapping disk block, wherein the overlapping disk block is a disk block having data from multiple compressed data segments.

14. The system of claim 13, wherein the at least one processor is configured to:

determine that a size of a sequential compressed data chunk stored in the disk blocks is equal to or smaller than a threshold size, the sequential compressed data chunk including one or more of the compressed data segments stored in the disk blocks; and repack the sequential compressed data chunk in one or more new disk blocks.

15. A method executed by one or more processors, comprising:

receiving a plurality of compressed data segments to be stored in disk blocks at a storage system;

sequentially storing the compressed data segments in the disk blocks such that at least one of the disk blocks includes compressed data from at least two of the compressed data segments;

using a reference count value of a compressed data segment stored in at least one of the disk blocks to determine whether the compressed data segment is garbage collectible, wherein the reference count value is a number of references made to the compressed data segment;

determining that the compressed data segment is not stored in a non-overlapping disk block, wherein the non-overlapping disk block is a disk block having data from a single compressed data segment; and setting the reference count value of the compressed data segment as a reference count value of an overlapping disk block minus a reference count value of each of all other compressed data segments stored in the overlapping disk block, wherein the overlapping disk block is a disk block having data from multiple compressed data segments.

16. A method executed by one or more processors, comprising:

receiving a plurality of compressed data segments to be stored in disk blocks at a storage system;

sequentially storing the compressed data segments in the disk blocks such that at least one of the disk blocks includes compressed data from at least two of the compressed data segments;

determining that a size of a sequential compressed data chunk stored in the disk blocks is equal to or smaller than a threshold size, the sequential compressed data chunk including one or more of the compressed data segments stored in the disk blocks; and repacking the sequential compressed data chunk in one or more new disk blocks, wherein the threshold size is a first threshold size when the sequential compressed data chunk involves an overlapping disk block only on one side and is a second threshold size when the sequential compressed data chunk involves overlapping disk blocks on both sides, wherein the overlapping disk block is a disk block having data from multiple compressed data segments.

17. A method executed by one or more processors, comprising:

receiving a plurality of compressed data segments to be stored in disk blocks at a storage system;

sequentially storing the compressed data segments in the disk blocks such that at least one of the disk blocks includes compressed data from at least two of the compressed data segments;

determining that a size of a sequential compressed data chunk stored in the disk blocks is larger than a threshold size, the sequential compressed data chunk including one or more of the compressed data segments stored in the disk blocks; and outputting a recommendation that the sequential compressed data chunk be repacked when an aggregate number of other sequential compressed data chunks with a same recommendation is equal to or greater than a threshold number.

18. A non-transitory computer-readable storage medium containing program instructions, wherein execution of the program instructions by one or more processors of a computer causes the one or more processors to perform steps comprising:

receiving a plurality of compressed data segments to be stored in disk blocks at a storage system;

sequentially storing the compressed data segments in the disk blocks such that at least one of the disk blocks includes compressed data from at least two of the compressed data segments;

using a reference count value of a compressed data segment stored in at least one of the disk blocks to determine whether the compressed data segment is garbage collectible, wherein the reference count value is a number of references made to the compressed data segment;

determining that the compressed data segment is not stored in a non-overlapping disk block, wherein the non-overlapping disk block is a disk block having data from a single compressed data segment; and setting the reference count value of the compressed data segment as a reference count value of an overlapping disk block minus a reference count value of each of all other compressed data segments stored in the overlapping disk block, wherein the overlapping disk block is a disk block having data from multiple compressed data segments.

19. A non-transitory computer-readable storage medium containing program instructions, wherein execution of the program instructions by one or more processors of a computer causes the one or more processors to perform steps comprising:

receiving a plurality of compressed data segments to be stored in disk blocks at a storage system;

sequentially storing the compressed data segments in the disk blocks such that at least one of the disk blocks includes compressed data from at least two of the compressed data segments;

determining that a size of a sequential compressed data chunk stored in the disk blocks is equal to or smaller than a threshold size, the sequential compressed data chunk including one or more of the compressed data segments stored in the disk blocks; and repacking the sequential compressed data chunk in one or more new disk blocks, wherein the threshold size is a first threshold size when the sequential compressed data chunk involves an overlapping disk block only on one side and is a second threshold size when the sequential compressed data chunk involves overlapping disk blocks on both sides, wherein the overlapping disk block is a disk block having data from multiple compressed data segments.

20. A non-transitory computer-readable storage medium containing program instructions, wherein execution of the program instructions by one or more processors of a computer causes the one or more processors to perform steps comprising:

receiving a plurality of compressed data segments to be stored in disk blocks at a storage system;

sequentially storing the compressed data segments in the disk blocks such that at least one of the disk blocks includes compressed data from at least two of the compressed data segments;

determining that a size of a sequential compressed data chunk stored in the disk blocks is larger than a threshold size, the sequential compressed data chunk including one or more of the compressed data segments stored in the disk blocks; and outputting a recommendation that the sequential compressed data chunk be repacked when an aggregate number of other sequential compressed data chunks with a same recommendation is equal to or greater than a threshold number.

21. A system comprising:

memory; and at least one processor configured to:

receive a plurality of compressed data segments to be stored in disk blocks at a storage system;

sequentially store the compressed data segments in the disk blocks such that at least one of the disk blocks includes compressed data from at least two of the compressed data segments;

use a reference count value of a compressed data segment stored in at least one of the disk blocks to determine whether the compressed data segment is garbage collectible, wherein the reference count value is a number of references made to the compressed data segment;

determine that the compressed data segment is stored in a non-overlapping disk block, wherein the non-overlapping disk block is a disk block having data from a single compressed data segment; and set the reference count value of the compressed data segment as a reference count value of the non-overlapping disk block.

22. A system comprising:

memory; and at least one processor configured to:

receive a plurality of compressed data segments to be stored in disk blocks at a storage system;

sequentially store the compressed data segments in the disk blocks such that at least one of the disk blocks includes compressed data from at least two of the compressed data segments;

determine that a size of a sequential compressed data chunk stored in the disk blocks is equal to or smaller than a threshold size, the sequential compressed data chunk including one or more of the compressed data segments stored in the disk blocks; and repack the sequential compressed data chunk in one or more new disk blocks, wherein the threshold size is a first threshold size when the sequential compressed data chunk involves an overlapping disk block only on one side and is a second threshold size when the sequential compressed data chunk involves overlapping disk blocks on both sides, wherein the overlapping disk block is a disk block having data from multiple compressed data segments.

23. A system comprising:

memory; and at least one processor configured to:

receive a plurality of compressed data segments to be stored in disk blocks at a storage system;

sequentially store the compressed data segments in the disk blocks such that at least one of the disk blocks includes compressed data from at least two of the compressed data segments;

determine that a size of a sequential compressed data chunk stored in the disk blocks is larger than a threshold size, the sequential compressed data chunk including one or more of the compressed data segments stored in the disk blocks; and output a recommendation that the sequential compressed data chunk be repacked when an aggregate number of other sequential compressed data chunks with a same recommendation is equal to or greater than a threshold number.

* * * * *